US007277861B1

(12) United States Patent
Benson et al.

(10) Patent No.: US 7,277,861 B1
(45) Date of Patent: Oct. 2, 2007

(54) INSURANCE POLICY RENEWAL METHOD AND SYSTEM

(75) Inventors: Mark H. Benson, Robbinsville, NJ (US); John Goldwater, Manassas, VA (US); Dean Watters, Larchmont, NY (US); George Kowalsky, Yardley, PA (US); Michael Healey, Milltown, NJ (US)

(73) Assignee: Westport Insurance Corporation, Overland Park, KS (US)

( * ) Notice: Subject to any disclaimer, the term of this patent is extended or adjusted under 35 U.S.C. 154(b) by 224 days.

(21) Appl. No.: 09/645,928

(22) Filed: Aug. 25, 2000

Related U.S. Application Data

(60) Provisional application No. 60/151,042, filed on Aug. 27, 1999.

(51) Int. Cl.
 *G06Q 40/00* (2006.01)
(52) U.S. Cl. .............................. 705/4; 705/38; 705/26; 705/27; 707/104.1
(58) Field of Classification Search .................... 705/4
 See application file for complete search history.

(56) References Cited

U.S. PATENT DOCUMENTS

| | | | | |
|---|---|---|---|---|
| 4,831,526 A | * | 5/1989 | Luchs et al. .................... | 705/4 |
| 5,202,827 A | * | 4/1993 | Sober .......................... | 705/36 |
| 5,523,942 A | * | 6/1996 | Tyler et al. .................... | 705/4 |
| 5,537,315 A | * | 7/1996 | Mitcham ....................... | 705/4 |
| 5,809,478 A | * | 9/1998 | Greco et al. ................... | 705/4 |
| 6,078,890 A | * | 6/2000 | Mangin et al. ................ | 705/2 |
| 6,119,093 A | * | 9/2000 | Walker et al. ................. | 705/4 |
| 6,526,386 B1 | * | 2/2003 | Chapman et al. ............. | 705/4 |
| 6,594,635 B1 | * | 7/2003 | Erlanger ........................ | 705/4 |
| 6,604,080 B1 | * | 8/2003 | Kern ............................. | 705/4 |

FOREIGN PATENT DOCUMENTS

WO    WO 049114 A2 * 6/2004

OTHER PUBLICATIONS

"Insurer Map Electronic Sales Battle Plan", Sep. 14, 1998, American Banker Publications, vol. 7, No. 35,pp. 1-3.*
"Online sales taking off", Apr. 28, 1998, Journal of Commerce, pp. 1-3.*
"Insurers close to Netting customers", Sep. 30, 1997, Journal of Commerce, pp. 1-3.*

(Continued)

*Primary Examiner*—Robert W. Morgan
(74) *Attorney, Agent, or Firm*—Armstrong Teasdale LLP

(57) ABSTRACT

A new business model incorporating the advantages of endowing a remote field agent with sole discretion to legally bind an insurance carrier to a renewal insurance policy contract is provided. Policy data associated with eligible renewal policies is generated according to specified criteria on a periodic basis. The policy data relating to a given policy subscriber is transmitted over the Internet to a data memory of a remote computer, where a field agent updates the policy data, as necessary, with new information gained about the policy subscriber. The field agent legally binds an insurance carrier to a resulting renewal policy reflecting the evaluated policy data, where the binding step is accomplished by the field agent acting independently without prior underwriting analysis, rating, or authorization by the insurance carrier, and where the entire transaction is accomplished in not more than five minutes.

32 Claims, 8 Drawing Sheets

OTHER PUBLICATIONS

National Underwriter, 10-year term allows automatic renewal without underwriting; Apr. 19, 1993, p. 35.*

Business Wire, ClientSoft Introduces eXoro, A Complete e-Service Solution for the Insurance Industry; Jun. 4, 1999, p. 1.*

Anonymous, Market Mix; Apr. 19, 1993, vol. 97, Iss. 16, p. 35, 2pgs.*

Anonymous, Market Mix, Apr. 19, 1993, National Underwriter, vol. 97, Iss. 16, p. 35, 2pgs.*

* cited by examiner

*— 340

| Renewal | |
|---|---|
| Your Governing Class code is: 5445 | ○ Yes ○ No |
| Operations:<br>If any of the operations listed below apply to class code 5445, then select them from the list (If more than one item applies, hold <CTRL> and use the mouse to select multiple operations).<br><br><u>>60% Residential</u><br>Does the employer pay governing class (5445) employees an average in excess of $6 per hour? | ○ Yes ○ No |
| Classification Footnotes/Special Rules:<br>Minimum Premium $10,000<br>Loss Control Survey required after binding<br><br>Does the employer financially contribute to a medical plan? | ○ Yes ○ No |
| Enter the Average weekly wage for 5445 | $ 100 |
| Does the employer have existing Experience Mods? | Yes    No |
| If so, list two most recent Experience Mods in decimal format<br>(List most recent first) | 1. 0.82<br>2. 0.82 |
|  | 342 Check Eligibility |

FIG. 6

Renewal

General Information

Does the applicant own, operate or lease aircraft/watercraft?

Do/Have past, present or discontinued operations involve(d) storing, treating, discharging, applying, disposing, or transporting of hazardous materials? (e.g. landfills, wastes, fuel tanks, etc.)

Any work performed underground or above 15 feet?

Any work performed on barges, vessels, docks, bridge over water?

Any group transportation provided?

Is there any volunteer or donated labor?

Do you lease employees to or from other employers?

Is the answer to any of the above questions "Yes"?  ○Yes  ⦿No

| Proposed Effective Date | Proposed Expiration Date |
|---|---|
| 11/03/1999 | 11/03/2000 |

Employer's Liability
Each Accident, Disease – Policy Limit, Disease –
   Each employee                                   [ 100-500-100 ▽ ]
Employers liability limits over
   1,000,000/1,000,000/1,000,000 are
   not available under the CyberComp program.

Legal Entity Type: [ Corporation ▽ ]
If not in list, Enter type here: [          ]

The quotation being requested should be considered an estimate and is subject to change based on inaccurate underwriting information received, changes in rates, experience modifications or any other items by jurisdictions which have control over such items. The policy is subject to audit and the payroll and underwriting information will be audited and the policy premium will be adjusted accordingly.

Quote not valid if any of the following apply: "A" Rated Classes, Aircraft Exposures, Federal Based Exposures (USL & H, FELA), Volunteers without charge, Agricultural Harvesting for others, Chemical & Dyestuff Rating Plan, Employee Leasing, Temporary Agencies, Occupational Disease Exposure or if the quote is in violation of any individual class code premium adjustment footnotes.

[ Do Not Accept ]    [ Accept ]

FIG. 8

| State | Class Code | Class Description | Premium Basis | Rate Per $100/ Factor | Est. Annual Premium |
|---|---|---|---|---|---|
| TN | 5445 | WALLBOARD INSTALLATION- WITHIN BUILDINGS & DRIVERS | $489,200.00 | 7.78 | $38,060.00 |
| TN | 8810 | CLERICAL OFFICE EMPLOYEES NOC | $10,400.00 | 0.20 | $21.00 |
| | | SubTotal | | | $38,081.00 |
| TN | 9898 | EXPERIENCE MODIFICATION | $38,081.00 | 0.97 | -$1,142.00 |
| TN | 9889 | SCHEDULE DEBIT | $36,939.00 | 0.05 | $1,847.00 |
| | | SubTotal | | | $705.00 |
| TN | 0063 | PREMIUM DISCOUNT | $38,786.00 | 9.50 | -$3,685.00 |
| TN | 0900 | EXPENSE CONSTANT | | | $140.00 |
| | | SubTotal | | | -$3,545.00 |
| | | Total For State | | | $35,241.00 |
| | | Total For Policy | | | $35,241.00 |

[Print Quick Quote]  [Bind]

The above quotation should be considered an estimate and is subject to change based on inaccurate underwriting information received, changes in rates, experience modifications or any other items by jurisdictions which have control over such items. The policy is subject to audit and the payroll and underwriting information will be audited and the policy premium will be adjusted accordingly.

Quote not valid if any of the following apply: "A" Rated Classes, Aircraft Exposures, Federal Based Exposures (USL & H, FELA), Volunteers Without Charge, Agricultural Harvesting for Others, Chemical & Dyestuff Rating Plan, Employee Leasing, Temporary Agencies, Occupational Disease Exposure or if the quote is in violation of any individual class code premium adjustment footnotes.

FIG. 9

WORKERS COMPENSATION CONFIRMATION RENEWAL

PRODUCER INFORMATION

| Agency Name | JACKSON GROUP |
|---|---|
| Agency Number | 0281915 |

APPLICANT INFORMATION

| Applicant Name | A B C DRYWALL, INC. |
|---|---|
| DBA Name | |
| Mailing Address | 3781, MAIN STREET |
| NCCI ID # | 440544253 |
| Federal Employer ID # | 621053171 |
| Other Rating Bureau ID # | 000000000 |

LOCATIONS

| 1 | Name | A B C DRYWALL, INC. | DBA Name | | | | |
|---|---|---|---|---|---|---|---|
| | Address | 3781, MAIN STREET | City | MEMPHIS | | | |
| | County | memphis | State | TN | Zip | 38118 | |
| | Number of Employees | 12 | | | | | |

POLICY INFORMATION

| Policy Number | Proposed Effective Date | Proposed Expiration Date | Normal Anniversary Rating |
|---|---|---|---|
| NWX60017160 | 11/03/1999 | 11/03/2000 | |

EMPLOYERS LIABILITY

| $100,000.00 | EACH ACCIDENT |
|---|---|
| $500,000.00 | DISEASE-POLICY LIMIT |
| $100,000.00 | DISEASE-EACH EMPLOYEE |

| State | Code | Class Description | Premium Basis | Rate Per $100/Factor | Est. Annual Premium |
|---|---|---|---|---|---|
| TN | 5445 | WALLBOARD INSTALLATION-WITHIN BUILDINGS & DRIVERS | $489,200.00 | 7.78 | $38,060.00 |
| TN | 8810 | CLERICAL OFFICE EMPLOYEES NOC | $10,400.00 | 0.20 | $21.00 |
| | | SubTotal | | | $38,081.00 |
| TN | 9898 | EXPERIENCE MODIFICATION | $38,081.00 | 0.97 | -$1,142.00 |
| TN | 9889 | SCHEDULE DEBIT | $36,939.00 | 0.05 | $1,847.00 |
| | | SubTotal | | | $705.00 |
| TN | 0063 | PREMIUM DISCOUNT | $38,786.00 | 9.50 | -$3,685.00 |
| TN | 0900 | EXPENSE CONSTANT | | | $140.00 |
| | | SubTotal | | | -$3,545.00 |
| | | Total For State | | | $35,241.00 |
| | | Total For Policy | | | $35,241.00 |

Does the applicant own, operate or lease aircraft/watercraft?

Do/Have past, present or discontinued operations involve(d) storing, treating, discharging, applying, disposing, or transporting of hazardous material? (e.g. landfills, wastes, fuel tanks, etc.)

Any work performed underground or above 15 feet?

Any work performed on barges, vessels, docks, bridge over water?

Any group transportation provided?

Is there any volunteer or donated labor?

Do you lease employees to or from other employers?

I agree that the response to all of the above questions is No.

This policy has been bound as of the effective date shown. A check in the amount of the required deposit must be received no later than 2 days of the effective date or appropriate notice of cancellation for non-payment of premium will be mailed.

The above quotation should be considered an estimate and is subject to change based on inaccurate underwriting information received, changes in rates, experience modifications or any other items by jurisdictions which have control over such items. The policy is subject to audit and the payroll and underwriting information will be audited and the policy premium will be adjusted accordingly.

Quote not valid if any of the following apply: "A" Rated Classes, Aircraft Exposures, Federal Based Exposures (USL&H, FELA). Volunteers Without Charge, Agricultural Harvesting for Others, Chemical & Dyestuff Rating Plan, Employee Leasing, Temporary Agencies, Occupational Disease Exposure or if the quote is in violation of any individual class code premium adjustment footnotes.

| APPLICANT'S SIGNATURE | PRODUCER'S SIGNATURE |
|---|---|
| | |

FIG. 10

INSURANCE POLICY RENEWAL METHOD AND SYSTEM

This application discloses subject matter disclosed in, and claims the benefit of the filing date of, U.S. Provisional Patent Application Ser. No. 60/151,042, filed Aug. 27, 1999.

FIELD OF THE INVENTION

This invention relates generally to a computerized method and system for controlling renewal specifications and authorizing renewal policies for renewal of insurance coverage. More particularly, the invention relates to a unique business method incorporating the advantages of endowing a remote field agent with sole discretion to legally bind an insurance carrier to a renewal insurance policy contract. This invention incorporates the advantages of transmission of renewal policy data over a global network, such as, for example, the Internet. Data is transmitted between a central server and a remote terminal staffed by the field agent, using a process such that the field agent can independently, and without employing traditional underwriting procedures, control pricing flexibility, billing plan and timing of both quotation and policy issuance, and locally authorize an offer for proposed insurance coverage and associated premium, in a response timeframe that is unattainable using known, traditional industry methods.

DESCRIPTION OF RELATED ART

Commercial activities, of which insurance underwriting is one example, have been shown to be enhanced by taking advantage of the speed and flexibility offered by electronically interconnecting various business operations. The Internet is a worldwide system of inter-connected computer networks. The Internet backbone enables computers of all kinds to share services and to communicate directly, as if they were part of one giant seamless global computing machine. The Internet is currently configured to join together large commercial communications services as well as thousands of university, government and corporate computer networks and other computers. Communications over the Internet is accomplished by defined communication protocols.

One particular aspect of the Internet which has gained widespread use is the World-Wide Web ("the Web"). The World-Wide Web is a subset of the Internet, which uses a specific protocol to permit communication between sites. Such communication between a computer at one site, and a computer at another site, may be interactive and is referred to as on-line. The Web is a collection of specially formatted Web documents, or pages, located on numerous computers around the world that are logically connected by the Internet. Web documents are commonly written in HTML (Hypertext Mark-up Language).

The computers storing the Web pages are called servers and are configured to transfer a copy of a stored Web page to a user's computer, by way of a host server to which the user's computer is connected. For example, a commercial insurance company might establish a series of Web pages on a server, so that remote personnel can view copies of them on their local computers. The Web server can either be directly operated by the insurance company, or Web server services can be contracted by the insurance company from a supplier. Either way, an entity that provides a Web page is called a "content provider", and typically, a content provider, such as an insurance company, provides a series of Web pages, each providing information and enabling the user to key-in questions about the information, and then receive answers on subsequent Web pages, or answer questions posed by a Web page and receive subsequent Web pages based on the supplied answers. Whether one Web page directs the user to one or more other Web pages, depends on how the Web page content provider has arranged the software underlying and supporting the Web page.

The HTML format is a scripting language which is used to generate the Web pages for different content providers. In this setting, a content provider is an individual or company that places information (content) on the Internet so that it can be accessed by field agents. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.).

A user, such as an insurance field agent, accesses the Internet using a personal computer equipped with a conventional modem or equivalent network connection device. Commercially available Web interface software called a "browser" is installed in the personal computer so that when the field agent wishes to access the Internet, an attached modem is automatically instructed to connect over telephone lines with the server of a local Internet Web service provider. The Internet Web server typically is accessed through a local telephone number, to avoid long distance telephone charges, and acts as a "post office" through which the field agent's requests for Web pages are forwarded, and through which requested Web pages are received and then passed to the user's personal computer. The user can then access information at any address accessible over the Internet. Two well-known Web browsers, for example, are the Netscape Navigator developed by Netscape, Inc. and the Microsoft Internet Explorer developed by Microsoft Corporation. These interfaces are highly graphic in nature, emphasizing a blend of pictures and stylistics intended to enhance the user's rapid understanding of the Web page content. Usually, selectable options chosen with a "click" of a mouse are available, as well as input boxes in which text, such as answers to questions posed by the Web page, can be typed.

In order to view Web pages originating from a particular content provider, such as an insurance company Web server, the field agent instructs the Web interface software, i.e., the browser, resident in the field agent's personal computer, to locate the server on which the insurance company's Web pages are stored, and to initiate transfer of an HTML-formatted Web page over the Internet to the user's Web interface software, which reads the embedded tags in the document so that the document appears formatted in a specified manner.

In practice, the field agent simply enters a "domain name", i.e., a name which is unique to the insurance company's Web server, and is relatively easy to remember, which the Web interface software converts to a unique Internet "address" of the insurance company's Web server. From that point on, the communication process occurs automatically between the field agent-connected local Web server and the insurance company-connected Web server, resulting in retrieval of the Web page from the insurance company's Web server and subsequent display on the field agent's personal computer. No connection between the field agent's computer and the insurance company's server is maintained after the Web page is provided to the user's computer. The Web page simply remains visible on the field agent's personal computer. At the direction of the field agent, typically with one key-stroke or mouse-click, the user's Web browser software re-initiates connections between the computers for each subsequent request for another Web page, or submission of the field agent's input. Importantly, the field agent can key-in input to a Web page, for example, in response to questions posed on the Web page received from an insurance company Web server, and upon keying in a "send" keystroke or mouse-click, that information will be transmitted back to the insurance company Web server, for subsequent processing.

The procedure traditionally employed by insurance companies for insurance policy renewal typically does not involve use of the Internet. Instead, a docketing reminder system is employed. At some predetermined period prior to the expiration data of a policy (usually 60-90-129 days), some type of pre-renewal letter is sent from the insurance carrier to their agency. This letter requests information including updated payrolls and other pertinent underwriting information that is needed by the insurance carrier in order to underwrite, i.e., accept or reject, and rate the renewal of the policy. The agency collects and completes this information by some set date, which usually is prior to the renewal data, and returns the information to the insurance carrier. The insurance carrier reviews the returned information, at which time it makes a decision to accept or reject coverage. If accepted, the carrier provides the agency with a quotation and/or renewal policy. If quoted prior to issuance, the agency must notify the carrier of its intent to accept, or bind, or lock in the quote. Once bound, i.e., upon acceptance of the quote, a policy is issued by the carrier. As is well known in the industry, this process may take weeks or months, depending on service levels provided by the agency and insurance carrier, and may extend well into the new policy period.

An alternative traditional insurance company procedure is one in which the insurance carrier establishes some type of automatic renewal of the policy, whereby an existing policy is put up against a preset underwriting and pricing template. If the policy fits, payrolls are automatically adjusted by a preset amount (5%, 10%, etc.) and a quotation and/or policy is automatically sent to the agent at a specific set time, i.e., 15/30 days prior to the effective date along with a predetermined billing plan. In this case, any necessary adjustment to payrolls or adjustments to pricing are negotiated between the carrier and agent, usually by endorsement to the renewal process. While this procedure is somewhat streamlined and speeds up the overall process of renewal, in comparison with the aforementioned procedure, nevertheless, considerable time transpires before the procedure, including the endorsement procedure, is complete.

Insurance underwriting has been conducted through the use of computerized automation in many phases of the insurance business, but until recently, such automation has included only limited use of the Internet. An example of such use is end-user advertisements, questionnaires and presentation of information. However, the improved flexibility and rapid response accompanying the use of Internet connectivity in commercial arenas makes possible new business paradigms heretofore not possible.

One such new business opportunity is in connection with the internal operations of an insurance company that processes high volumes of insurance policies of a type having profit margins that are exceptionally sensitive to operating costs, for example, renewal of workman's compensation insurance policies. It has been found that despite excellence in all pertinent business areas, and especially in cost management, profit margins obtainable after accounting for operating costs, are relatively small for this type of policy renewal business, as compared with other aspects of the insurance business. Future viability in such a business under current market trends has been shown to increasingly depend on cost containment in the face of processing high volumes of policies.

An example of this requirement is exemplified by the specific business of obtaining renewal of insurance policies, and in particular, renewal of workman's compensation policies. What is needed is a system and method for achieving cost savings that are substantially greater than attainable from achieving efficiencies through application of known computer and network techniques. Instead of such traditional data processing solutions alone, a combination of a new business paradigm coupled with computing and network techniques is needed to achieve viability in a margin-sensitive insurance business.

It is an object of the present invention to provide a system that eliminates a substantial number of steps in a traditional policy renewal process and enables shifting responsibility for authorizing acceptance of the terms and conditions of a proposed renewal policy and binding of the insurance carrier, from a central authority to field agents geographically remote from the carrier.

Another object of the present invention is to provide a system that enables a field agent geographically remote from a carrier to evaluate an insurance policy subscriber's policy attributes and independently determine on the spot that the subscriber attributes are such that the insurance carrier is legally bound to the terms and conditions of the policy under the authority of its field agent.

Still another object of the present invention is to provide a system that enables the field agent to control renewal specification, timing, quotation, pricing, billing and quotation/policy issuance.

Another object of the present invention is to provide a system that drives policy approval response time downward from industry norms of days and months to not more than five minutes.

Still another object of the present invention is to provide a system that achieves competitive policy pricing directly as a reflection of the overall reduced cost of operations due to the absence of routing every policy renewal decision through a traditional underwriting and rating process, before authorization to bind the insurance carrier is achieved.

Another object of the invention is to provide a system that utilizes the Internet and associated Web pages as a "user-friendly" interactive communications vehicle between a central data source and disparate field agents.

Another object of the invention is to provide a system that is applicable to a broad range of instances requiring remote, but rapid action effected by remote agents making authorization decisions without the necessity of first securing prior approval.

SUMMARY OF THE INVENTION

In accordance with the present invention, a policy renewal system is provided for generating policy data associated with eligible renewal policies on a periodic basis, transmitting the policy data relating to a given policy subscriber over a data network to the data memory of a remote computer, enabling a field agent operating the remote computer to update the policy data, as necessary, in light of any new information gained about the policy subscriber, and enabling the field agent to legally bind an insurance carrier to a resulting policy reflecting the evaluated policy data, where the binding step is accomplished independently by the field agent without prior underwriting analysis or authorization by the insurance carrier.

The present invention combines a unique business model incorporating the advantages of endowing a remote field agent with sole discretion to legally bind an insurance carrier to a renewal insurance policy contract, with the advantages of transmission of renewal policy data over the Internet between a central server and a remote terminal staffed by the field agent. This approach operates completely opposite to, and in stark contrast with, traditional insurance business models. Traditional insurance business models require that all policies, whether new policies or renewal policies, cycle through an underwriting and rating process employing staffing and resources, with attendant operating costs and often substantial delay. The cost and relatively sluggish response times of such traditional policy writing paradigms are the primary factors affecting the competitive policy renewal business. Therefore, in the case of the renewal policy business, substantial moderation of these factors is achieved by completely eliminating the underwriting process cycle associated with binding each, individual, renewal policy. This is accomplished first, by identifying policies eligible for renewal, second, by applying a business process in which each field agent independently, and without employing traditional underwriting resources, evaluates the identified renewal policy data and independently binds an insurance carrier to the terms and conditions of the policy. Third, the timing advantages obtained by eliminating underwriting procedures are capitalized on, and even further improved upon, through efficiencies gained through use of workload and information distribution over the Internet between a central policy data storage means and geographically separated field agents.

In order to achieve a reduction in renewal policy process timing to a few minutes, as compared to traditional methods requiring days, weeks and sometimes months, the field agent must be in electronic communication with the source of the renewal policy data, which typically is a data processing system managed by the insurance carrier, or an organization supporting the insurance carrier, so that policy renewal transactions can be readily initiated and completed in not more than five minutes or less, including interview of the policy subscriber, input of updated data, and output of a revised policy in a form suitable for legal binding. At no time in the insurance industry, has such a response time been routinely achieved. This procedure must be unaffected by variability in the training level of the field agent and substantial numbers of eligible policies simultaneously being renewed.

Implicit to the process of the present invention, is the shift of authorization responsibility away from a central authority, such as a "home office", where resources possessing adequate levels of expertise and judgment review and determine approval of the terms of each individual policy in light of the policy subscriber's attributes, i.e., an underwriting and rating procedure, and toward the field agent. Without such risk-management resources in place, the insurance carrier is potentially subject to increased risk of being bound to a policy having less than satisfactory terms and conditions. In the aggregate, a carrier bound to numerous policies having terms and conditions adverse to the interests of the carrier potentially would be subject to substantial costs. On the other hand, where a carefully selected group of risk-assessment factors are included in underwriting the original, new policy, and are included for review and update by the agent, as part of the policy renewal procedure, the resulting exposure to increased risk is minimized. The fact that the renewal business relates to existing policy subscribers improves the odds, because an insurance-history has been developed by the carrier. The risk-assessment factors, optionally in the form of questions, can be included in an Internet Web page for inspection and update by the field agent. In addition, rapidity of response presents additional marketing benefits, as does competitive pricing reflecting the overall reduced cost of operations due to the absence of routing every policy renewal decision back through a home office approval process to achieve authorization to bind.

The method and system according to the present invention further includes an renewal policy eligibility generator, which applies a set of criteria to data corresponding to a group of policies, to determine a subset group of policies that are eligible for renewal. Identification of those policies eligible for renewal is then made available, for example, by being included in an Internet Web page, to respective field agents for further processing.

The policy renewal method according to the present invention is applicable to a broad range of applications requiring rapid action effected by remote agents making authorization decisions without first securing prior approval, and is not limited to insurance policies, renewal policies, or contracts.

The system and method of the present invention utilizes a network, such as the Internet, over which renewal policy data is transmitted in the form of Web pages. An eligible renewal policy generator is arranged to generate policy data corresponding to any renewal policy eligible for renewal within some desired time period. All such data is arranged by field agent and made available in the form of a Web page, one page per policy, for example, although other arrangements are envisioned.

The nature of the policy data is twofold. In the case of workman's compensation insurance coverage, the policy data includes information previously on file relating to the policy subscriber, such as number of employees and the insurance class of work to be performed. The policy data also includes a set of questions tied to the particular classification of work, wherein the questions provide a venue for updating the existing policy data. Any field agent, by operating commercially available Internet browser software on a personal computer connected to the Internet, can access Web pages associated with the agent, through use of a suitable security arrangement, such as a password. Optionally, other information important to the agent's work is also available in Web page form.

The field agent cycles through the Web pages associated with a given renewal policy, inputting updated or new information as necessary and transmitting each Web page back to the central policy data storage location. The submitted data is screened by the inventive system for input errors and completeness and general acceptability. During this procedure, the agent answers any necessary update-questions associated with the class of work for which insurance coverage is to be provided, until a Web page is received indicating that the renewal policy is in condition to be bound. At this point, the agent has the option of saving the data for future access and suspending further action to another time, and also has the option of printing the policy data, and optionally other information. In the alternative, the agent can input an indication on the Web page that the insurance carrier is to be legally bound to the terms and conditions of a renewal policy represented by the input policy data. Transmission of the Web page to the central policy data storage location binds the insurance carrier and will cause the system to respond with a Web page indicating that the carrier is so bound. A representation of the renewal policy is transmitted to the agent in the form of one or more separate Web pages, which can be printed.

The system according to the present invention is configured and arranged so that the total time required between initial receipt of the policy data and producing a printed copy of a bound policy is not more than five minutes or less. If the agent fails to follow the renewal update procedure, the system of the present invention automatically triggers a policy, based on preset timing, billing plan and underwriting defaults.

In the alternative, upon receipt of policy data, the field agent operates independently by completing the above-described procedures obtained from a locally stored program, in order to achieve a bound renewal policy.

BRIEF DESCRIPTION OF THE DRAWINGS

FIG. 6 illustrates an example policy renewal input Web page including questions pertinent to the previously entered governing class code according to the present invention;

FIG. 8 illustrates an example policy renewal input Web page including additional questions relating to the policy subscriber's attributes according to the present invention;

FIG. 9 illustrates an example of a bind renewal input Web page including pertinent data, associated premiums, and entry button for binding the insurance carrier to the terms and conditions of the policy, according to the present invention;

FIG. 10 illustrates an example of a confirmation Web page 380 according to the present invention.

DESCRIPTION OF THE PREFERRED EMBODIMENTS

Figure 1:
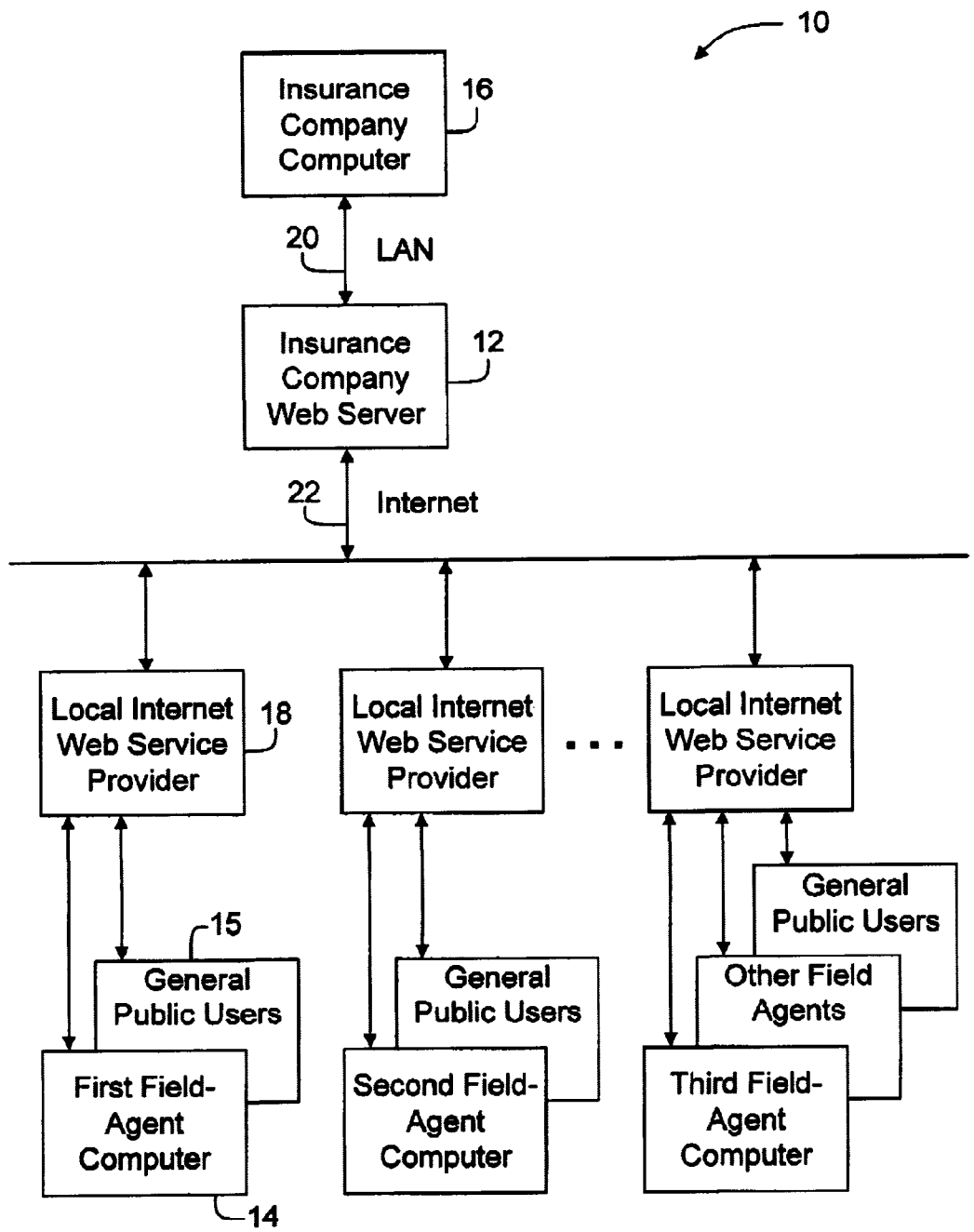
FIG. 1 is a simplified block diagram of the Insurance Policy Renewal Method and System, according to the present invention.

As shown in FIG. 1, a system 10 consistent with the present invention provides for the processing of insurance policy data over local area networks, dedicated data lines, cellular, personal communication systems (PCS), microwave, satellite networks, the Internet, through dial up access, satellite uplink or any other network using an open communications protocol, such as TCP/IP, or any other suitable form of data communications. Some of the computing elements of the system preferably connect to each other via a public switched telephone network. Subscriber attributes 310 and, eligibility questions 312, described below, travel through these connections. Other corporate information, such as latest revision forms, business data, business news, personnel information, and the like, may also be communicated through these connections.

System 10 includes an insurance company Web server 12, at least one field agent computer 14, which preferably is a personal computer, and an insurance company computer 16. Computer 16 can be one or more large transaction processor computers. In accordance with the invention, the system integrates the operation of the insurance company Web server 12, the agent computers 14, and the insurance company computer 16, so that insurance policies eligible for renewal are identified and arranged to be automatically forwarded to the field agent for action. In the preferred embodiment, the insurance company Web server 12 manages a common connection via the Internet between insurance company information systems operations, which include insurance company computer 16, and geographically remote field agent computers 14. Field agent computers 14 may also be subscriber computers, where a subscriber is, or employs, the insured. The insurance company computer 16 may be replaced by, or operatively connect with, third party computers, which provide other functions such as claims processing and review of prior authorization requests. The insurance company computer 16 and the third party computer and the insurance company Web server 12 preferably are capable of communicating on, and are interconnected by, an insurance company local area network (LAN) 20 or other suitable data link.

Computers 12, 14, and 16 are integrated for the performance of at least three main functions: (1) storage of policy information and identification of policies eligible for renewal; (2) organization of eligible renewal policy information by field agent, transmission of renewal policy information to each field agent and receipt of field agent input; and (3) enabling a field agent to independently process a renewal policy, evaluate subscriber input and approve a renewal policy for binding, effect contractual binding of the insurance company, and transmit information relative to a bound policy to the insurance company home office. The field agent communicates with the insurance company home office through Web screens made available on the field agent computer by Web browser software. These functions, described below, are depicted in FIGS. 3-10, respectively.

The field agent computers 14 preferably are WINDOWS-compliant personal computers operating WINDOWS 3.x, or later release software, capable of communicating on, and are interconnected by, the Internet 22 or dial up access over a public switched telephone network. Web browser software 24 installed on the field agent computer 14 enables the field agent to easily connect with the Internet by way of a local Internet Web service provider, which runs software on a local Internet service provider Web server 18, arranged to pass requests for Web pages from the field agent over the Internet to the insurance company Web server 12, and to receive and then convey requested Web pages to the Web browser software 24 running on the agent's computer 14. The field agent uses a computer keyboard and computer mouse as an input device 26 to request Web pages, and to respond to their content. At the same time, other general public users 15 are also connected to the Internet service provider Web server, which simultaneously handles transactions initiated by them to other content providers unrelated to the insurance company. Each user is unaware of the activity of any other user. The insurance company or third party processor computers may alternatively be connected to the insurance company Web server 12 either by the Internet or a dial-up access arrangement.

Figure 2:
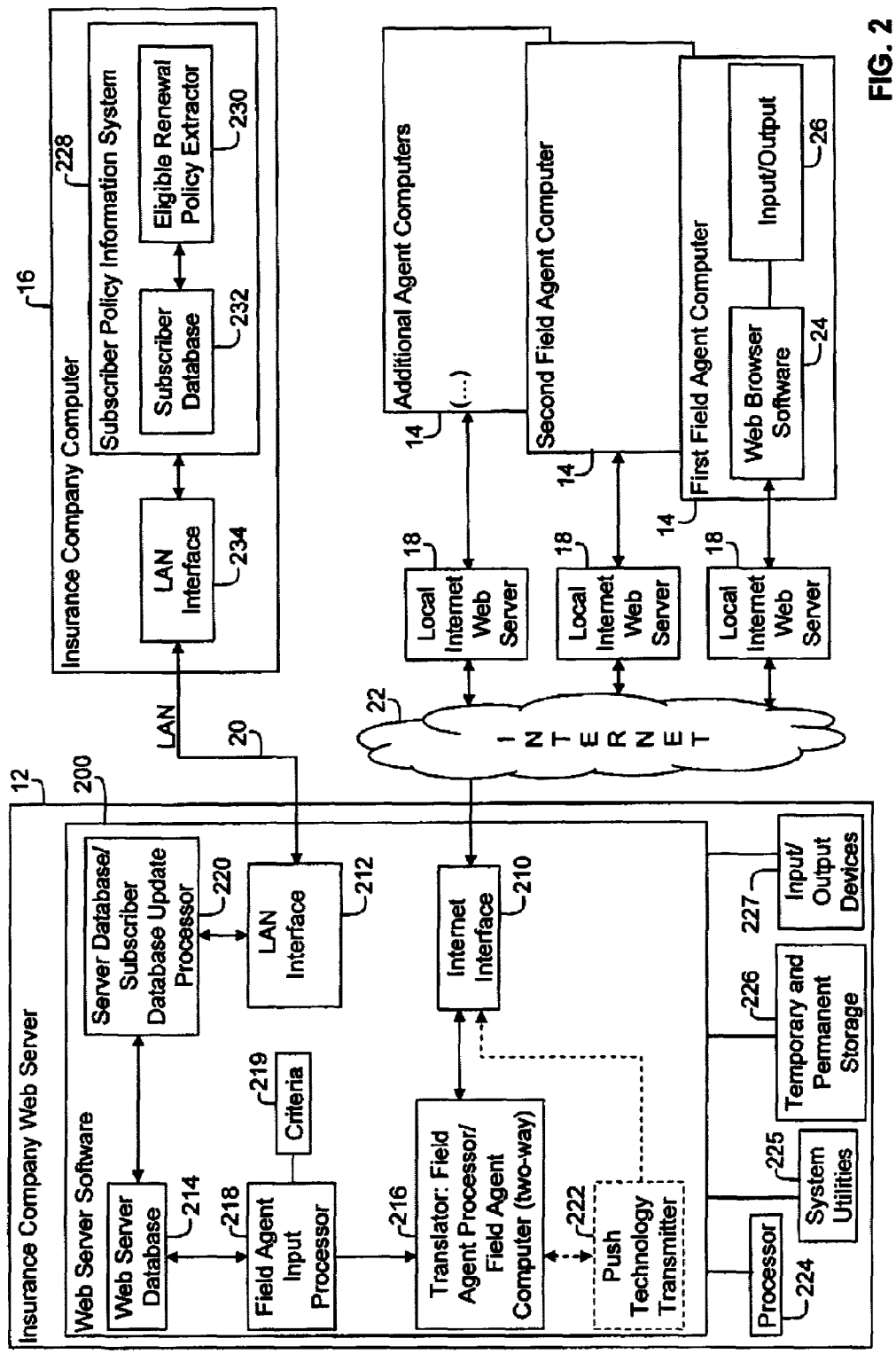
FIG. 2 is a simplified block diagram of the system of FIG. 1, showing the interconnection between computer and network components, according to the present invention.

As shown in FIG. 2, insurance company Web server 12 is preferably capable of high volume processing, performing a significant number of mathematical calculations in processing communications and database searches. Insurance company Web server 12 may be a conventional personal computer or a computer workstation with sufficient memory and processing capability. The operating system of the insurance company Web server 12 may be DOS, WINDOWS 3.x, or later release, OS/2, AIX, or any other known and available operating system. Internet interface 210 supports a number of Internet access tools including, for example, an HTTP-compliant Web browser. The present invention is designed to operate within any of these known or developing Web browsers. Internet interface 210 may also support other Internet services including simple mail transfer protocol (SMTP) or e-mail, file transfer protocol (FTP), network news transfer protocol (NNTP) or "Usenet", and remote terminal access (Telnet).

Insurance company Web server 12 operates as a primary Web server, which operably includes server software 200 for both receiving and transmitting communications via Internet interface 210 and LAN interface 212. Insurance company Web server 12 preferably includes a Web server database 214, such as an Access, SQL, or other open database-compliant database, although any suitable database will suffice. Web server database 214 is operatively connected to Internet interface 210 and LAN interface 212, as well as to other processes, including a translator 216, a field agent activity processor 218 connected to a policy renewal criteria storage 219, a Web server database/subscriber database update processor 220, and optionally, a push-technology process 222. All processes within insurance company Web server 12 are operatively connected to a central processing unit 224, system utilities 225, temporary and permanent storage 226, and input/output devices 227 commonly found in commercially available servers, and in accordance with known practices.

Insurance company computer 16 can be any high volume, transaction processing computer in the present or future marketplace. Such computers are common to insurance company operations, and may be mainframe computers, or more typically a midrange computer such as IBM's AS/400. Primary databases used in such systems typically are in a predetermined format, such as DB2, VSAM, ISAM, and are adaptable to any proprietary database by customizing a translator (not shown), which provides an interface between any proprietary database and the server's database.

Insurance company computer 16 includes a subscriber policy information system 228, which includes an eligible renewal policy extractor process 230 operatively connected to a subscriber database 232 and to a LAN interface 234. Subscriber database 232 includes data associated with a subscriber's current policy for a group of subscribers. Optionally, the insurance company includes multiple insurance providers for the group of policy subscribers. A subgroup of policy subscribers is identified as being associated with a particular field agent, although other groupings are possible.

In operation, the system of the present invention, on a monthly basis, for example, is arranged so that the eligible renewal policy extractor 230 generates a list of insurance policies that are eligible for renewal from the subscriber database 232. The eligible renewal policy extractor 230 applies a set of criteria arranged to determine which of a larger group of policies are eligible for renewal. Extractor 230 can be an expert system, for example, a rule-based system, and rules used by the expert system preferably are subject to update and modification. Data representing eligible renewal policies is transferred via LAN interface 234 from the insurance computer 16, over LAN 20, through LAN interface 212 of insurance company Web server 12, to a Web server database/subscriber database update processor 220. Update processor 220 updates the contents of Web server database 214, based on data generated by the eligible renewal policy extractor 230, and in a separate, reverse operation, updates the subscriber database 232, based on data generated by the field agent activity processor 218.

Field agent activity processor 218 manages data flow between Web server database 214 and each field agent. In the outbound direction, preferably field agent activity processor 218 accumulates all eligible renewal policy data associated with each field agent and, upon demand by a given field agent, populates a Web page with eligible renewal policy data for which the requesting agent is responsible. Alternatively, field agent activity processor 218 populates, for all field agents, an individual Web page with all eligible renewal policy data associated with a given field agent, stores all Web pages, and makes each Web page available for transmission over the Internet to the corresponding field Agent, upon demand. In another embodiment, upon demand by a field agent, processor 218 accumulates the requisite eligible renewal policy data associated with that field agent, and populates a Web page on the fly. In still another alternative embodiment, upon demand by a field agent, all aforementioned processes are initiated on the fly, thereby obtaining a direct extraction from the subscriber database 232. Preferably, processor 218 formats the resulting Web page to be interpreted by an HTTP-compliant Web browser, or any comparable format appropriate for current Internet communications technology.

Optionally, a push technology transmitter 222 is arranged to communicate alternatively with companion push technology receiver software (not shown), or Web browser software, resident in each field agent's computer. Push technology transmitter 222, using any of the aforementioned processes, or similar processes, generates Web pages for each field agent and, using known push technology processes, automatically broadcasts the data to the field agent's computer without further human intervention, i.e., "pushes", the generated pages via Internet interface 210, over the Internet 22 to the field agent's computer 14.

Figures 3, 4, 5:
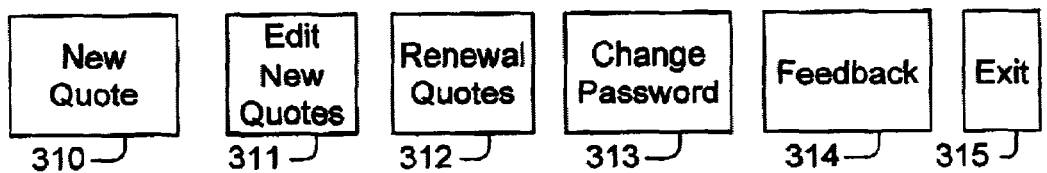
FIG. 3 illustrates an example of graphic "buttons" arranged at the top or bottom of various Web pages according to the present invention.
FIG. 4 illustrates an example policy information search request Web page according to the present invention.
FIG. 5 illustrates an example policy renewal input Web page obtainable by selecting the "Renewal Quotes" button 312 according to the present invention.

FIG. 3 illustrates an example of graphic "buttons" arranged at the top or bottom of various screens, which preferably are Web pages. Other buttons are envisioned, and the exemplary embodiment is shown for descriptive purposes. The field agent mouse-clicks button 310 to initiate a "New Quote" process, which retrieves a Web page formatted for entry of policy data for a new policy subscriber. Button 311, "Edit New Quotes" returns to a "New Quote" screen if input has been suspended or interrupted. Button 312 is used to initiate a "Renewal Quotes" process, which retrieves a Web page formatted for entry of renewal policy data for an existing policy subscriber. Buttons 313, "Change Password", 314, "Feedback", and 315, "Exit", enable the field agent to perform the indicated tasks.

FIG. 4 illustrates an example policy information search request Web page 320. The field agent enters one or more of policy number, account name, or other search options, in order to obtain desired policy information. A mouse-click on either button 322, "Submit", or button 324, "Exit", enables the agent to submit the Web page, as edited, or alternatively, to cancel the input, as well as the entire Web page. The system according to the present invention is arranged to transmit a replacement screen, depending on system parameters.

FIG. 5 illustrates an example policy renewal input Web page 330, which is obtainable by selecting the "Renewal Quotes" button 312. The policy renewal Web page includes one or more insurance class codes relevant to the policy subscriber, as well as, for example, payroll dollars. Drop-down windows further detailing class description, for example, are provided. Buttons 332, "Update Class Description" and 334, "Proceed" respectively, enable the field agent to update information on the Web page or proceed to the next Web page.

FIG. 6 illustrates an example policy renewal input Web page 340 including questions pertinent to the previously entered governing class code. Button 342, "Check Eligibility" enables the field agent to submit the information entered on the Web page.

Figure 7:
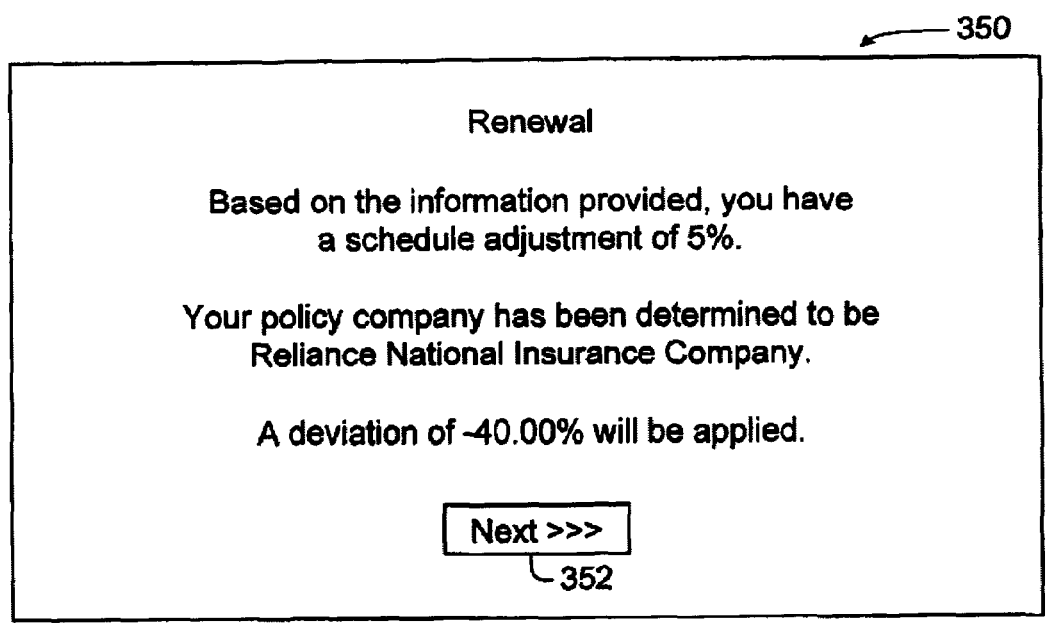
FIG. 7 illustrates an example policy renewal response Web page including policy information relating to the policy subscriber data input via prior Renewal input screens according to the present invention.

FIG. 7 illustrates an example Renewal response Web page 350, including policy information relating to the policy subscriber data input via prior Renewal input Web pages. A "Next" button 352 enables the field agent to proceed to the next Web page.

FIG. 8 illustrates an example Renewal input Web page 360, which includes questions originally answered by the policy subscriber at the time the subscriber originally applied for the policy. Web page 360 includes provision for updating answers to the questions. Button 362, "Do Not Accept" and button 364, "Accept" enable the field agent to stop the process, or proceed to the next step, respectively.

FIG. 9 illustrates an example of a final Renewal input Web page 370, which includes pertinent data and associated premiums. A "Print Quick Quote" button 372 is provided so that the agent is able to obtain a paper copy of the policy data, as amended. A "Bind" button 274 is also provided, with which the field agent clicks to legally bind the insurance carrier to the terms and conditions of the policy.

FIG. 10 illustrates an example of a Confirmation Web page 380, the receipt of which is the final step of the renewal policy procedure. Web page 380 represents the bound renewal policy, including all pertinent policy subscriber's attributes, as well as corresponding premium data. The agent is able to print a copy of the Confirmation Web page 380 through the normal personal computer print functions.

The invention claimed is:

1. A method for evaluating insurance policy data corresponding to a proposed renewal policy for binding an associated insurance carrier and renewing the policy under the authority of a field agent geographically remote from the carrier, the insurance carrier having a local computer including an eligibility generator, the field agent having a remote computer including a data display in communication with the local computer, said method comprising the steps of:

storing in a database policy data relating to a plurality of insurance policies issued by the insurance carrier, the database in communication with the local computer;

providing pre-determined criteria for determining each insurance policy eligible for a renewal evaluation without requiring external underwriting and risk assessment processes, the no-underwriting eligibility criteria is pre-determined by the insurance carrier, the no-underwriting eligibility criteria including whether a change has occurred in an insurance work classification assigned to a subscriber of the corresponding insurance policy being evaluated for renewal without external underwriting and risk assessment processes, and whether a change has occurred in a number of employees of the subscriber;

identifying at least one insurance policy as being eligible for a renewal evaluation by applying the no-underwriting eligibility criteria to the policy data stored in the database for each insurance policy, the criteria applied to the policy data stored in the database using the eligibility generator;

displaying at the field agent computer a first Web page, the first Web page including policy data corresponding to the at least one identified renewal policy;

updating at the field agent computer the policy data corresponding to the at least one renewal policy by inputting data corresponding to attributes of a subscriber on Web pages displayed on the field agent computer;

transmitting the updated policy data from the field agent computer to the associated insurance carrier;

processing at the local computer the updated policy data for the at least one identified renewal policy to determine whether the identified renewal policy is eligible for renewal without requiring external underwriting and risk assessment processes;

receiving at the field agent computer a proposed renewal policy based on the updated policy data including a premium amount for the subscriber if the at least one identified renewal policy is eligible for renewal;

receiving at the field agent computer a second Web page indicating that the proposed renewal policy for the subscriber is in condition such that the associated insurance carrier can be bound to the terms and conditions of the proposed renewal policy; and entering a bind indication on the second Web page by the field agent and transmitting the second Web page with the bind indication from the field agent computer to the carrier to complete the binding, wherein the binding by the field agent legally binds the associated insurance carrier to the terms and conditions of the proposed renewal policy.

2. The method of claim 1 further including receiving one or more Bind Confirmation Web pages including acknowledgement that said associated insurance carrier has been bound to the terms and conditions of a renewal policy reflecting the bind Web page.

3. A method according to claim 1 wherein said step of updating at the field agent computer the policy data further comprises prompting the field agent to input into a Web page displayed on the field agent computer updated policy data relating to the subscriber including at least one of a number of employees, a payroll amount, an insurance work class code, and a work class description.

4. A method for renewing an insurance policy under the authority of a field agent for binding an insurance carrier, the insurance carrier having a local computer including an eligibility generator, the field agent located in a geographically remote location from the insurance carrier, the field agent having a remote computer including a data display, said method comprising the steps of:

storing in a database policy data relating to a plurality of insurance policies issued by the insurance carrier, the database in communication with the local computer;

providing pre-determined criteria for determining each insurance policy eligible for a renewal evaluation without requiring external underwriting and risk assessment processes, the no-underwriting eligibility criteria is pre-determined by the insurance carrier, the no-underwriting eligibility criteria including whether a change has occurred in an insurance work classification assigned to a subscriber of the corresponding insurance policy being evaluated for renewal without external underwriting and risk assessment processes, and whether a change has occurred in a number of employees of the subscriber;

identifying at least one insurance policy as being eligible for a renewal evaluation by applying the no-underwriting eligibility criteria to the policy data stored in the database for each insurance policy, the criteria applied to the policy data stored in the database using the eligibility generator;

receiving at the field agent computer policy data reflecting an insurance policy identified as being eligible for a renewal evaluation;

providing the field agent with predetermined questions by displaying the predetermined questions on the field agent computer, the predetermined questions selected so as to minimize financial risk to the insurance carrier of being contractually bound to policy terms unfavorable to the insurance carrier;

answering the predetermined questions by inputting answers corresponding to attributes of the subscriber to the identified insurance policy into the field agent computer;

updating using the local computer the policy data for the identified insurance policy based on the inputted answers and determining whether the identified policy is eligible for renewal without requiring external underwriting and risk assessment processes;

receiving at the field agent computer a proposed renewal policy based on the updated policy data including a premium amount for the subscriber if determined that the identified policy is eligible for renewal; and entering a bind indication into the field agent computer to bind the insurance carrier to the terms and conditions of the proposed renewal policy reflecting the answers, wherein the binding is accomplished by a decision process undertaken by the field agent without including external underwriting and rating processes.

5. The method of claim 4 wherein the steps of receiving at said field agent computer policy data, providing the field agent with predetermined questions, answering the predetermined questions, and binding the insurance carrier, are accomplished by successive receipt, update, and transmission of a sequence of Web pages.

6. The method of claim 5 wherein said receipt, update, and transmission of a sequence of Web pages occurs between the field agent computer operated by the field agent and an insurance company Web server computer, wherein the field agent computer and the Web server computer are interconnected by a connection.

7. The method of claim 6, wherein the total time required between said step of receiving at said field agent computer policy data and said step of binding the insurance carrier is not more than five minutes.

8. The method of claim 6, wherein the insurance policy and the predetermined questions are unrelated to insurance and the insurance carrier is any company issuing the policy.

9. The method of claim 6, wherein the Web pages are information screens, and the connection between the field agent computer and the Web server computer is a data network connection including an Internet connection.

10. The method of claim 6, wherein the field agent includes at least one of a subscriber to an insurance policy eligible for renewal and an employer responsible for the policy subscriber.

11. A method according to claim 4 wherein said step of providing the field agent with predetermined questions further comprises prompting the field agent to input into the field agent computer updated policy data relating to the subscriber including at least one of a number of employees, a payroll amount, an insurance work class code, and a work class description.

12. A method according to claim 11 wherein said step of receiving at the field agent computer further comprises receiving at the field agent computer policy data corresponding to a renewal of a workman's compensation insurance policy.

13. A method for renewing a policy via Internet connections between a central data memory and a remote data memory, a policy issuer associated with a central computer having an eligibility generator, said method comprising the steps of:

storing in the central data memory policy data relating to a plurality of policies issued by the policy issuer, the central data memory in communication with the central computer;

providing pre-determined criteria for determining each policy eligible for a renewal evaluation without requiring external underwriting and risk assessment processes, the no-underwriting eligibility criteria is pre-determined by the policy issuer, the no-underwriting eligibility criteria including whether a change has occurred in an insurance work classification assigned to a subscriber of the corresponding policy being evaluated for renewal without external underwriting and risk assessment processes, and whether a change has occurred in a number of employees of the subscriber;

identifying one or more policies as being eligible for a renewal evaluation by applying the no-underwriting eligibility criteria to the policy data stored in the database for each policy, the criteria applied to the policy data stored in the central data memory using the eligibility generator;

generating in the remote data memory a first Web page including data identifying the one or more eligible policies for the renewal evaluation, the central data memory associated with the issuer of one or more eligible renewal policies, the remote data memory associated with a field agent located in a geographically remote location from the policy issuer;

selecting by the field agent a policy from the identified one or more eligible policies;

generating in the central data memory a request for policy data relating to the selected policy;

generating in the central data memory and transmitting over a network one or more second Web pages arranged to include the requested renewal policy data along with a provision for inputting update data;

receiving, displaying, updating in the remote memory, and transmitting from the remote memory, the one or more second Web pages wherein said receiving, displaying, updating and transmitting is accomplished by the field agent;

processing at the central computer the renewal policy data for the selected policy to determine whether the selected policy is eligible for renewal without requiring external underwriting and risk assessment processes;

receiving and displaying in the remote memory a proposed renewal policy if determined that the selected policy is eligible for renewal; and transmitting to the central data memory from the remote data memory a third Web page including binding indication data to bind the policy issuer to the proposed renewal policy associated with the renewal policy data, wherein said binding is accomplished by a decision process undertaken independently by the field agent without including external underwriting and risk assessment processes.

14. The method of claim 13, prior to the step of binding the policy issuer, further comprising the step of:

transmitting update information relating to the policy from the remote data memory to the central data memory over the network where the update information is screened to form a completeness and accuracy response; and transmitting the completeness and accuracy response to the remote data memory; and displaying the completeness and accuracy response as part of a Web page.

15. The method of claim 14, wherein the total time required between said transmitting update information relating to said policy step and said enabling the field agent to bind the policy issuer step is not more than five minutes.

16. The method of claim 13, wherein the policy issuer is an insurance carrier and the policy is a renewal insurance contract having terms under which an insurance carrier issuing the policy is legally bound.

17. The method of claim 13, wherein the field agent includes at least one of a subscriber to an insurance policy eligible for renewal and an employer responsible for the policy subscriber.

18. A policy renewal system for renewing a policy under the authority of a field agent for binding an issuer of the policy after the policy has been identified as eligible for a renewal evaluation, the policy issuer having an eligibility renewal policy generator for generating policy data for at least one policy eligible for the renewal evaluation, said system comprising:

a network;

a database for storing policy data relating to a plurality of policies issued by the policy issuer;

pre-determined criteria for determining each policy eligible for a renewal evaluation without requiring external underwriting and risk assessment processes, the no-underwriting eligibility criteria is pre-determined by the policy issuer, the no-underwriting eligibility criteria including whether a change has occurred in an insurance work classification assigned to a subscriber of the corresponding policy being evaluated for renewal without external underwriting and risk assessment processes, and whether a change has occurred in a number of employees of the subscriber, the no-underwriting eligibility criteria stored within the database;

a remote data display associated with a field agent and configured for displaying said policy data in a form readable by the field agent, the field agent located in a geographically remote location from the policy issuer; and the eligibility generator, the database and said remote data display connected to said network, the eligibility generator configured to identify at least one policy as being eligible for the renewal evaluation by applying the no-underwriting eligibility criteria to the policy data stored in the database for each policy, said remote data display configured to:

receive over the network policy data relating to the at least one identified renewal policy, display said policy data relating to the at least one identified renewal policy, prompt the field agent to update the displayed policy data, transmit the updated policy data to the eligibility generator for processing, receive from the policy issuer a proposed renewal policy including the updated policy data if the eligibility generator determines that the at least one identified renewal policy is eligible for renewal, and transmit bind data to the database to enable the field agent to legally bind the policy issuer to a renewal of said proposed renewal policy associated with said updated policy data, the binding accomplished independently by the field agent without underwriting analysis or risk analysis by the policy issuer.

19. The system of claim 18, wherein the policy issuer is an insurance carrier, the policy is an insurance policy, the network is the Internet, and said policy data are data in the form of at least one Web page document.

20. A method according to claim 3 wherein said step of displaying at the field agent computer further comprises displaying at the field agent computer policy data corresponding to a renewal of a workman's compensation insurance policy.

21. A system according to claim 18 wherein said remote data display is further configured to display predetermined questions prompting the field agent to update said policy data by inputting data corresponding to attributes of a subscriber to said at least one renewal policy including at least one of a number of employees, a payroll amount, an insurance work class code, and a work class description.

22. A system according to claim 21 wherein said at least one renewal policy is a workman's compensation insurance policy.

23. A system for renewing an insurance policy after the policy has been identified as eligible for a renewal evaluation, said system comprising:

predetermined criteria for determining each policy eligible for a renewal evaluation without requiring external underwriting and risk assessment processes, the no-underwriting eligibility criteria is pre-determined by an insurance carrier, the no-underwriting eligibility criteria including whether a change has occurred in an insurance work classification assigned to a subscriber of the corresponding policy being evaluated for renewal without external underwriting and risk assessment processes, and whether a change has occurred in a number of employees of the subscriber;

at least one computer configured as a server, said server comprising an eligibility generator coupled to a database of policy data for a plurality of insurance policies issued by the insurance carrier, said server associate with the insurance carrier, the no-underwriting eligibility criteria stored within the database, said eligibility generator configured to identify at least one insurance policy as being eligible for the renewal evaluation by applying the no-underwriting eligibility criteria to the policy data stored in the database for each insurance policy; and at least one remote computer including a user interface connected to said server through a network, said remote computer associated with a field agent located in a geographically remote location from the insurance carrier, said remote computer configured to:

receive policy data from said server for an insurance policy identified as being eligible for the renewal evaluation wherein the policy data includes information relating to a subscriber of said policy, display said policy data on said user interface, prompt the field agent by displaying predetermined questions on said user interface to update the policy data, receive from the field agent updated policy data including updated subscriber information, display the updated policy data on the user interface such that the field agent can evaluate the updated policy data, transmit the updated policy data to said server to determine whether the identified insurance policy is eligible for renewal, receive from said server a proposed renewal policy including a premium amount for the subscriber if said server determines that the identified insurance policy is eligible for renewal, and transmit bind data to the database to enable the field agent to legally bind the insurance carrier to the proposed renewal policy associated with the evaluated policy data, wherein the binding is accomplished by a decision process undertaken independently by the field agent without underwriting analysis and risk analysis by the insurance carrier.

24. A system according to claim 23 wherein the insurance policy is a workman's compensation insurance policy, and wherein the subscriber is an employer.

25. A system according to claim 24 wherein subscriber information comprises at least one of a number of employees, a payroll amount, an insurance work class code, and a work class description.

26. A system according to claim 24 wherein subscriber information further comprises an amount representing an average hourly salary for all employees of the employer within each insurance work class assigned to the employer.

27. A system according to claim 24 wherein subscriber information further comprises information relating to whether the employer financially contributes to a medical plan available to employees included within a specific insurance work classification.

28. A system according to claim 24 wherein subscriber information further comprises information relating to whether the employer has an existing Experience Modification.

29. A system according to claim 28 wherein, if the employer has existing Experience Mods, subscriber information further comprises information relating to at least a most recent Experience Modification in decimal format.

30. A system according to claim 24 wherein subscriber information further comprises information relating to at least one of: whether the employer at least one of owns, operates, and leases aircraft; whether the employer at least one of owns, operates, and leases watercraft; whether the employer performs any work underground or above fifteen feet; whether the employer performs any work on at least one of barges, vessels, docks, and bridges over water; whether the employer provides any group transportation; and whether the employer leases employees to or from other employers.

31. A system according to claim 24 wherein said remote computer is further configured to display and print updated policy data including a premium basis, an estimated annual premium, and a work class description for each insurance work class code assigned to the employer.

32. A system according to claim 24 wherein said remote computer is further configured to search said database for a specific insurance policy eligible for renewal by prompting the field agent to input at least one of a policy number and an account name.

* * * * *